United States Patent Office 3,405,580
Patented Oct. 15, 1968

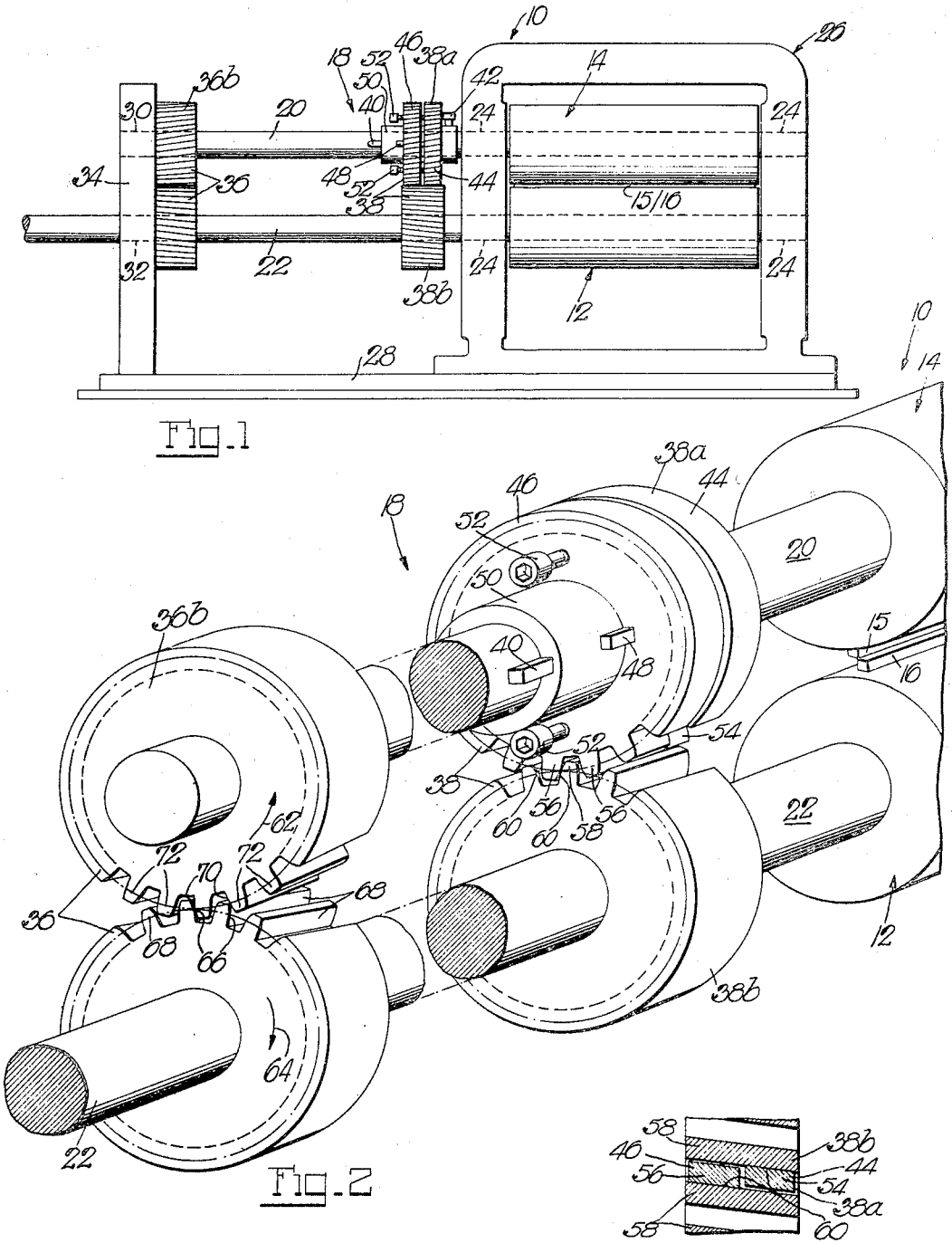

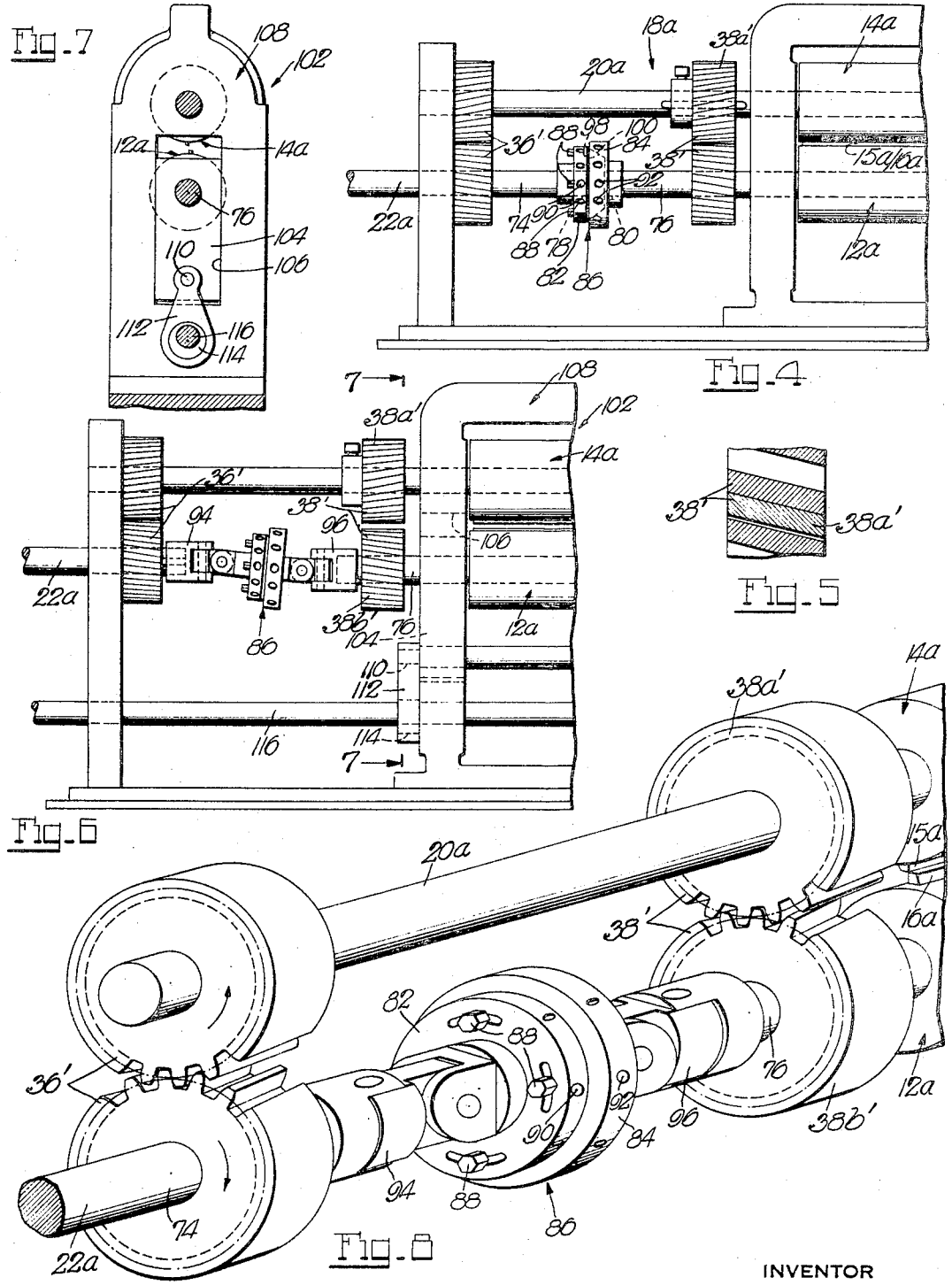

3,405,580
ROTARY SHEAR DRIVE
Karl W. Hallden, Thomaston, Conn., assignor to The Hallden Machine Company, Thomaston, Conn., a corporation of Connecticut
Filed May 24, 1966, Ser. No. 552,621
5 Claims. (Cl. 83—305)

ABSTRACT OF THE DISCLOSURE

In a rotary shear the shear drums are carried by driving and driven shafts, respectively, and provided are two pairs of gears of which the gears of each pair are mounted on the respective shafts and the gear pairs are spaced from each other. One of these shafts is formed in separate aligned sections of which each section has mounted thereon one of the gears on the one shaft, and these shaft sections carry betwen the gear pairs the companion elements of an angularly adjustable coupling.

---

This invention relates to rotary shears in general, and to rotary shear drives in particular.

In the usual drives of rotary shears a power shaft directly drives one of the two companion shear drums and carries on either side of the drum a drive gear which is in mesh with a similar gear on the other shear drum for the drive of the latter from the power shaft. In order significantly to reduce, if not substantially eliminate, operational separation of the companion shear blades in cutting action and, hence, avoid malfunctioning of the shear in various ways such as failing to cut or cutting only incompletely or producing ragged cut edges, a backlash take-up gear may be substituted for one of the drive gears. However, while the use of a backlash take-up gear in this fashion will bring the desired result of avoiding malfunctioning of the companion shear blades from operational separation, it will also produce excessive stresses in the gear teeth which not only have to transmit the entire drive torque to the shear drum driven thereby but must also absorb the periodic and sudden separating forces of considerable magnitudes of the shear blades in action, with ensuing early and excessive wear, and correspondingly short useful life, of these gears.

It is one of the important objects of the present invention to provide a rotary shear drive in which the operating gears transmit the drive torque to the shear drums and operate without backlash to avoid malfunctioning of the shear, yet the operational stresses to which the gear teeth are subjected are so much smaller in magnitude than in the prior drum gears that their operational wear is no longer excessive and is, in fact, so much reduced that the useful life of these gears is greatly prolonged.

It is another object of the present invention to provide a rotary shear drive in which the aforementioned drum-operating gears of backlashless performance are provided, not in one pair as in prior shear drives, but rather in two pairs, and to arrange for cooperation between the gear pairs so that the stresses involved in transmitting the driving torque and preventing operational shear blade separation are divided between both gear pairs rather than confined to a single pair of drum gears as heretofore, whereby operational wear of the gear teeth is greatly reduced and the useful life of the shear without malfunctioning correspondingly prolonged.

It is a further object of the present invention to provide a rotary shear drive in which the aforementioned gear pairs include backlash take-up gearing for their designated performance. To this end, both pairs of gears are mounted on the drum shafts and the gear pairs are arranged as "lock" gears and "drive" gears, of which the pair of lock gears is provided in close proximity to the shear drums and includes a backlash take-up gear, while the pair of drive gears is spaced from the shear drums preferably at a greater distance, and in no event at a smaller distance, than the lock gears. With this arrangement, and with the backlash gear set to take up the backlash in all gears, the lock gears will prevent the short shaft lengths between them and the drums from responding in resilient torsion to separating tendencies of the shear blades in cutting action, and it is by virtue of this lack of responsive shaft torsion that the shear drums are locked against such blade separation and the drive gears encounter no blade-separating forces regardless of whether they are provided in preferred manner on the same side of the drums as the lock gears, or are provided for any reason on the side of the drums opposite to that on which the lock gears are provided.

It is another object of the present invention to provide a rotary shear drive of alternate form in which the aforementioned pairs of operating gears lack a backlash take-up gear, and the backlash of all gears is taken up, insted, by relatively turning the gears on one of the drum shafts, i.e., the adjustment gears, to backlash take-up position and provide for locking them in this position on the shaft. With this arrangement, only one flank of a single tooth of each gear is at any instant in meshing contact with one flank of a single tooth of another gear, and the tooth flanks in meshing contact at any instant of the respective gear pairs lock the shear drums against clashing approach and operational separation, respectively, of their shear blades, with either one pair of gears or both pairs of gears transmitting the drive torque as a matter of choice and depending on the direction in which the backlash of the gears is taken up. There is thus achieved singular tooth flank contact at any instant between the gears of each pair which may advantageously afford the drive system a degree of resilient torsional give, under gear stresses, in the drum shafts depending on their dimensions, and thereby keep gear wear at a tolerable minimum without incurring malfunctioning of the shear at either choice of directional gear backlash take-up.

A further object of the present invention is to devise a method by which, in accordance with another aspect of the invention, resilient torsion is introduced in a rotary shear drive of the aforementioned alternate form, by relatively turning the adjustment gears on one of the drum shafts not only to take up all gear blacklash, but also with sufficient force to impart to both drum shafts between the gear pairs resilient torsion, and to lock the adjusted gears against relative rotation while the drum shafts are still under resilient torsion, whereby both shafts are locked against recovery from their resilient torsion by and between the back-to-back contacting tooth flanks of the gears of both pairs. With this arrangement, the applied torsion in the drum shafts may be selected so as partially or entirely to overpower the operational separating forces of the shear blades in cutting action and, hence, keep operational shear blade separation at selected minimum or avoid it altogether, and by constant and uniform subjection throughout of the contacting took flanks of both gear pairs to this applied shaft torsion, the constant and uniform torsion load on the gear teeth has far less wear effect on the latter than would a periodically occurring torsion load thereon of the same magnitude ensuing from resilient shaft torsion in response to the operational separating forces of the shear blades in cutting action. Further, this constant and uniform torsion load on the gear teeth either greatly minimizes or wholly obviates any shock effect on the meshing gears from the periodic and sudden operational blade-separating forces. Still further, with gear wear being uniform over the entire operating or contact flank of each tooth of each gear pair, the profile of the gear teeth will be substantially preserved after undergoing some wear so that the gears will even then continue to mesh accurately and with minimum friction for the longest time. Thus, gear wear may in this fashion be kept at a minimum at which the shear will perform reliably and accurately for the longest time.

Another object of the present invention is to provide a rotary shear drive of the aforementioned alternative form in which the provisions for torsioning the drum shafts and/or locking the gears in backlash take-up relation are in the preferred simple form of an angularly adjustable coupling interposed in one of the drum shafts between the gears thereon, with this drum shaft being to that end provided in two separate sections on which the companion coupling elements are mounted.

This coupling is in the further preferred and advantageous form of a cone-type friction clutch which for its size affords large companion friction surfaces that will not give way to any operational forces, including applied resilient torsion in the drum shafts, once they are locked together at reasonably low specific pressure in adjusted clutch condition.

It is a further object of the present invention to provide a rotary shear drive of the aforementioned alternative form which is adapted for a rotary mis-cut shear of which one of the shear drums is movable into and from shearing relation with the other shear drum, with the shaft of the movable shear drum having to this end an intermediate flexible section and the gears thereon being provided on the remaining end sections, and the gear on the end section which moves with this drum being in mesh with its companion gear only when the movable drum is in shearing relation with the other drum. In this adaptation of the shear drive to a rotary mis-cut shear, the shear drive performs with all of the aforementioned advantages, with the drive being automatically restored to its preset stress pattern in backlash take-up and resilient shaft torsion on each return of the movable shear drum into shearing relation with the other shear drum.

Further objects and advantages will appear to those skilled in the art from the following, considered in conjunction with the accompanying drawings.

In the accompanying drawings, in which certain modes of carrying out the present invention are shown for illustrative purposes:

FIG. 1 is a front view of a rotary shear the drive of which embodies the present invention;

FIG. 2 is a fragmentary perspective view of the operating components of the same shear drive;

FIG. 3 is a fragmentary section through two of the cooperating components of the same shear drive;

FIG. 4 is a fragmentary front view of a rotary shear the drive of which embodies the invention in a modified manner;

FIG. 5 is a fragmentary section through two of the cooperating components of the shear drive in FIG. 4;

FIG. 6 is a fragmentary front view of a modified rotary shear which for its operation has a further modified drive;

FIG. 7 is a fragmentary section taken on the line 7—7 of FIG. 6; and

FIG. 8 is a fragmentary perspective view of the operating components of the shear drive in FIG. 6.

Referring to the drawings, and more particularly to FIGS. 1 and 2 thereof, the reference numeral 10 designates a rotary shear having companion shear drums 12 and 14 with shear blades 15 and 16, and a drive 18 for the shear drums. The shear drums 14 and 12 are carried by spaced parallel shafts 20 and 22 which are journalled in suitable bearings 24 in a shear frame 26 on a base 28, with the shafts 20 and 22 extending in this instance beyond one end of the frame 26 and being further journalled at 30 and 32 in an upright 34 on the base 28.

The shear drive 18 includes the shafts 20 and 22, of which the exemplary shaft 22 is the driving shaft by being driven from any suitable prime mover (not shown), while the other shaft 20 is the driven shaft. The shear drive 18 further provides a gear drive connection between the shafts 20 and 22 which, in accordance with one aspect of the present invention, is in the form of two pairs of meshing gears 36 and 38, with both pairs of gears being mounted on the shafts 20 and 22, in this instance between the shear frame 26 and the upright 34. Except as hereinafter pointed out, the gear pairs 36 and 38 are identical, and all gears are preferably helical gears, with one of the gears, in this instance the gear 38a being at 40 splined to the shaft 20 and at 42 locked to this shaft in axially adjusted position thereon. Axial adjustablity of the helical gear 38a relative to its meshing companion gear 38b permits accurate adjustment of the shear blades 15, 16 for their cutting cooperation either in alignment with each other or at a slight gap between them, depending on the cutting operation.

In accordance with another aspect of the present invention, one of the gears 38, in this instance the gear 38a, is in the form of a backlash take-up gear having complemental gear parts 44 and 46, of which gear part 44 is in this instance splined at 40 to the shaft 22 and releasably locked to the latter at 42 for shear blade adjustment as described, while the other gear part 46 is at 48 splined to the hub 50 of gear part 44 for axial adjustability thereon for the purpose of taking up all backlash between the gears 36 and 28. Thus, with the gears 36 and 38 having the usual backlash, even after axial adjustment of the gear 38a on its shaft 20 for angular shear blade adjustment which is usually well within the backlash freedom of the gears, all backlash between the gears is taken up on axially separating the gear parts 44 and 46, in this instance on shifting gear part 46 axially away from the other gear part 44 by adjustment screws 52, until on take-up of all backlash the teeth 54 and 56 of the gear parts 44 and 46 presently meshing with the nearest teeth 58 of the companion gear 38b bear against the adjacent flanks 60 of these nearest gear teeth 58 (FIG. 3). With all gear backlash thus taken up in the proper direction for the normal drive of the shafts 20 and 22 in the exemplary directions of the arrows 62 and 64, i.e., with the turnwise leading flanks 66 of the teeth 68 of the gear 36 on the driving shaft 22 being at all times retained in contact with the turnwise trailing flanks 70 of the then intermeshed teeth 72 of the gear 36b on the driven shaft 20 (FIG. 2), the drive torque, which is applied to the driving shaft 22 in this instance at its left end as viewed in FIG. 2, is through this shaft directly transmitted to the lower shear drum 12, and is through the "drive" gears 36 transmitted to the upper gear drum 12. The other or "lock" gears 38 thus take no part in transmitting the drive torque to either shear drum, but they function, by virtue of their closer proximity to the shear drums than the drive gears 36 and full interlock of their meshing teeth (FIG. 3), to lock the shear drums 12, 14 against clashing approach of their shear blades 15, 16 as well as against operational separation of the latter in cutting action. With the present shear drive arrangement there is, therefore, this advantage that the drum-driving and drum-locking functions are divided between two pairs of gears, with one pair of gears solely performing the drum-driving function and the other pair of gears solely performing the drum-locking function, whereby the operational stresses in and wear of the teeth of the gears are kept at a readily permissible minimum at which the gears will perform accurately for a long period. This same advantage will be as fully secured even if for some reason the lock gears 38 should be provided, contrary to the preferred arrangement shown, on the side of the drums opposite to that on which the drive gears 36 are provided.

Reference is now had to FIG. 4 which shows a modified rotary shear drive 18a that differs from the described shear drive 18 of FIGS. 1 and 2 in that for gear backlash take-up recourse is had to an adjustable coupling, rather than to a backlash take-up gear, in the drive, with ensuing further advantages. Thus, with the gear pairs 36' and 38' being identical and preferably of helical type and the gear 38a' being in this instance also axially adjustable on its shaft 20a, the other, driving, shaft 22a is formed in two spearate axially-aligned sections 74 and 76 to provide adjacent shaft ends 78 and 80 on which are mounted the relatively turnable companion elements 82 and 84 of an adjustable coupling 86. In order to take up all backlash between the gears 36' and 38' it is merely necessary relatively to turn or adjust the coupling elements 82 and 84 in either direction until stopped by the gears themselves when the backlash is taken up, whereupon the thus adjusted coupling elements are preferably locked together, as by clamping screws 88 which extend through arcuate slots (not shown) in the coupling elements 82 and are threadedly received in the other coupling element 84. Relative turning of the coupling elements 82 and 84 for firm take-up of all gear backlash may be facilitated by using bars of good leverage that may be inserted in any of a plurality of bores 90 and 92 in these coupling elements. Gear backlash take-up in this fashion also affords a choice of either of two different functional performances of the gear pairs 36' and 38' depending on the direction in which the gear backlash is taken up, whereby at either choice there is secured the advantage that at any time only one flank of a tooth of a gear of each pair is in contact with one flank of a tooth of the companion gear of the same pair. Insofar as this choice of functional performances of the gear pairs 36' and 38' is concerned, their performance according to one choice is demonstrated in FIG. 8 in which the elements 82 and 84 of the coupling 86 though shown mounted on the sections 74 and 76 of the shaft 22a through intermediation of universal drive connections 94 and 96 for a purpose hereinafter described, will for present purposes perform the same as the coupling elements in FIG. 4. Accordingly, on relatively adjusting the coupling elements 82 and 84 in one direction for gear backlash take up as shown in FIG. 8 and also FIG. 5, the lower, driving shaft 22a will transmit the driving torque via the gears 36' and shaft 20a to the upper shear drum 14a, and via the same gears 36' and shaft 20a and further via the gears 38' to the lower shear drum 12a. Further, the gears 36' lock the shear drums 12a and 14a against operational separation of their shear blades 15a and 16a in cutting action, while the other gears 38' lock the shear drums against clashing approach of their shear blades, as can be clearly observed in FIG. 8. Accordingly, in this one choice of gear performance, both gear pairs participate in the torque transmission to the shear drums, while the functions of locking the shear drums against clash approach of their shear blades and against operational separation of the latter in cutting action are performed by the respective gear pairs 38' and 36'.

In the gear performance according to the other choice, the gear backlash is taken up in the opposite direction at the coupling 86 in self-evident manner, whereby the tooth flanks of both gear pairs 36' and 38' reverse from their contacting tooth flanks in FIG. 8 will be in contact, as will be readily understood. The driving torque is then transmitted via shaft 22a to the lower shear drum 12a, and via the same shaft 22a and further via the gears 38' to the upper shear drum 14a, and the gears 38' then also lock the shear drums against operational separation of their shear blades in cutting action, while the other gears 36' then perform the sole function of locking the shear drums against clash approach of their shear blades.

The also featured singular tooth flank contact at any instant between the gears of each pair 36' and 38' will advantageously afford the drive system a degree of resilient torsional give, under gear stresses, in the shafts 20a and 22a depending on their dimensions, and thereby keep gear wear at a tolerable minimum without incurring malfunctioning of the shear at either choice of gear performance.

In accordance with another aspect of the present invention, recourse may be had to a method of introducing beneficial resilient torsion in the shear drive of FIGS. 4 and 8. This involves, in the exemplary shear drive, relatively turning the coupling elements 82 and 84 in either direction with sufficient force not only to take up all gear backlash but further to impart resilient torsion to both shafts 20a and 22a between the gear pairs 36' and 38', and while holding the coupling elements with adequate force to prevent recovery of the shafts from their applied resilient torsion, locking these coupling elements to each other, whereby on release of the latter from this holding force the meshing gear pairs lock both shafts against recovery from their resilient torsion. In thus introducing resilent torsion in the shear drive, the applied torsion in the shafts may be selected so as partially or entirely to overpower the operational separating forces of the shear blades in cutting action and, hence, keep operational shear blade separation at a selected minimum or avoid it altogether, and by constant and uniform subjection throughout of the contacting tooth flanks of both gear pairs to this applied shaft torsion, the constant and uniform torsion load thereon of the same magnitude ensuing from resilient shaft torsion in strict response to the operational periodic and sudden separating forces of the shear blades in cutting action. Further, this constant and uniform torsion load on the gear teeth either greatly minimizes or wholly obviates any shock effect on the meshing gears from the periodic and sudden shear blade separating forces in cutting action of the shear blades. Still further, with gear wear being uniform over the entire operating or contact flank of each tooth of each gear pair, the profile of the gear teeth will be substantially preserved after undergoing some wear so that the gears will even then continue to mesh accurately and with minimum friction. Thus, gear wear may in this fashion be kept at a minimum at which the shear will perform reliably and accurately for the longest time.

The coupling 86 is in its preferred form a friction clutch the companion elements 82 and 84 of which have frustoconical friction surfaces 98 and 100 (FIG. 4). This clutch thus affords for its size large companion friction surfaces that will not give way to any operational forces, including applied resilient torsion in the shafts, once they are locked together by the bolts 88 at reasonably low specific pressure in adjusted clutch condition (see also FIG. 8).

The method of introducing resilient torsion in the shear drive, having been described in connection with the specific shear drive 18a having the exemplary adjustable coupling 86, provides, in its more basic concept within the scope of the present invention, for applying a twisting force to one shaft between the gears thereon to subject it to resilient torsion; while applying this twisting force, turning one of the gears on its shaft (for example gear 38b' on shaft 22a in FIG. 8) in one direction into a position in which the gears oppose recovery of this shaft from its resilient torsion; and while still applying this twisting force, locking this one gear in its mentioned position to its shaft, whereby on release of this shaft from the twisting force the meshing gears distribute the torsion forces over both shafts and lock the latter against recovery from their resilient torsion.

Reference is now had to FIGS. 6 and 7 which show a rotory shear 102 of miscut-type that may in all respects be like the shear of FIG. 4, except that the lower shear drum 12a is, for cut and miscut action, movable into and from shearing relation with its companion drum 14a, and the shear drive is modified accordingly. The shaft section 76, carrying the lower shear drum 12a, is for operational movability of the latter to and from the other shear drum 14a (FIGS. 6 and 8) journalled in spaced slide blocks 104 which are guided in vertical guideways 106 in the shear frame 108 and pivotally connected at 110 with follower arms 112 on spaced eccentrics 114 on a shaft 116 which under suitable control is driven through one revolution for each cut action and remains idle in the position of FIG. 6 for each miscut action, with the shear drums being shown in cut action in FIG. 8 which also shows the specific drive of the miscut shear 102 of FIG. 6, with this drive having the universal drive connections 94 and 96 between the separate sections 74 and 76 of the shaft 22a and an intermediate shaft section which in this instance is the adjustable coupling 86, for the continuous drive of the lower shear drum 12a even when the same is in miscut position (FIG. 6) in which the gear 38b′ is also out of mesh with its companion gear 38a′. The present shear drive performs the same as, and with all the described advantages of, the shear drive of FIG. 4, except that resilient torsioning of the shafts and/or gear backlash take-up must be undertaken while the lower shear drum 12a is in cutting position and the gears 38′ in mesh (FIG. 8), with resilient shaft torsion and/or gear backlash take-up being lost on each descent of the lower shear drum 12a into miscut position (FIG. 6), but fully restored on each ascent of the latter into cut position and ensuing remesh of the gears 38′ (FIG. 8).

The invention may be carried out in other specific ways than those herein set forth without departing from the spirit and essential characteristics of the invention, and the present embodiments are, therefore, to be considered in all respects as illustrative and not restrictive, and all changes coming within the meaning and equivalency range of the appended claims are intended to be embraced therein.

What is claimed is:

1. In a rotary shear, the combination with companion shear drums having shear blades, of spaced parallel driving and driven shafts carrying said shear drums; two pairs of meshing gears of which the gears of each pair are carried by said shafts, respectively, with one of said shafts being formed in separate aligned sections each carrying a gear of a pair; and a coupling having angularly adjustable companion elements mounted on said shaft sections, with said coupling elements being angularly adjustable for take-up of the backlash in said gear pairs in opposite directions so that on backlash take-up in one direction one of said gear pairs performs first and second functions of transmitting the driving torque to said driven shaft and locking said shear drums against operational separation of their shear blades in cutting action, respectively, and the other gear pair performs a third function of locking said shear drums against clash approach of their shear blades, and on backlash take-up in the other direction said one gear pair performs said third function and said other gear pair performs said first and second functions, and said other gear pair is closer to the shear drums than said one gear pair.

2. The combination in a rotary shear as in claim 1, in which said driving shaft has on one side of said drums an end receiving the driving torque which is further transmitted through said driving shaft, and said gear pairs are between said shaft end and drums.

3. In a rotary shear, the combination with companion shear drums having shear blades, of spaced parallel driving and driven shafts carrying said shear drums; two pairs of meshing gears of which the gears of each pair are carried by said shafts, respectively, with one of said shafts being formed in separate aligned sections each carrying a gear of a pair; and a coupling in the form of a friction-type cone clutch with angularly adjustable companion clutch elements mounted on said shaft sections for take-up of the backlash in said gear pairs.

4. In a rotary shear of miscut type, the combination with axially parallel companion shear drums having shear blades and being supported for rotation about their axes, with one of said drums being also guided for movement normal to its axis into and from an operating position in which it is in shearing relation with the other drum, and driving and driven shafts, of which a first shaft is axially aligned and drivingly connected with said other drum, and the second shaft has two end sections and an intermediate section, of which one end section is axially aligned and turnable as well as movable with said one drum and the other end section is axially aligned with said one end section in said drum operating position, while said intermediate section has universal driving connections with said end sections; of two pairs of gears, of which the gears of one pair are in permanent mesh and carried by said first shaft and said other shaft end section, respectively, and the gears of the other pair are carried by said first shaft and said one shaft end section, respectively, and are in mesh only in said operating drum position, with one of said shafts being between said gear pairs interrupted to provide adjacent shaft ends; and a coupling having angularly adjustable companion elements mounted on said shaft ends, whereby on angular adjustment of said coupling elements for take-up of all backlash in the gears backlash take-up is restored in all gears on each movement of said one drum into its operating position.

5. A method of introducing resilient torsion in the drive of a rotary shear having spaced parallel driving and driven shear drum shafts and two pairs of meshing gears on and drivingly connecting the shafts, of which one shaft is between the gears thereon formed in separate aligned sections carrying the relatively turnable companion elements of an adjustable coupling, and a certain one of said shafts has end sections of which one end section is axially fixed and the other end section is movable normal to its axis into shear cut and miscut positions, and an intermediate section having universal drive connections with said end sections, with the gears of one pair being in permanent mesh and carried by said one shaft end section and the other shaft, and the gears of the other pair being carried by said other shaft end section and other shaft and in mesh only in said cut position of said other shaft end section, which method comprises relatively turning said elements with sufficient force to impart resilient torsion to both shafts between the gears thereon when said other shaft end section is in said cut position; and while holding said elements with a force to prevent recovery of the shafts from their torsion, locking said elements to each other, whereby on release of said elements from said holding force resilient torsion is restored in both shafts on each movement of said other shaft end section into said cut position.

References Cited

UNITED STATES PATENTS

| 2,118,402 | 5/1938 | Hallden | 83—305 |
| 2,641,937 | 6/1953 | Erhardt et al. | 74—409 |
| 3,037,396 | 6/1962 | Martin | 74—409 |

ANDREW R. JUHASZ, *Primary Examiner.*